United States Patent [19]

Yatabe et al.

[11] Patent Number: 4,590,118

[45] Date of Patent: May 20, 1986

[54] SELECTIVE LIGHT TRANSMISSION SHEET

[75] Inventors: Toshiaki Yatabe; Nobuo Suzuki; Yoshio Itakura, all of Tokyo, Japan

[73] Assignee: Teijin Limited, Osaka, Japan

[21] Appl. No.: 581,001

[22] Filed: Feb. 16, 1984

[30] Foreign Application Priority Data

Feb. 17, 1983 [JP] Japan ................................... 58-23842
Dec. 15, 1983 [JP] Japan ................................. 58-235157

[51] Int. Cl.$^4$ ........................ B32B 27/18; B32B 15/08
[52] U.S. Cl. .................... 428/215; 428/336; 428/339; 428/461; 428/469; 428/689; 428/696
[58] Field of Search ................. 428/461, 425.9, 469, 428/336, 339, 689, 696, 215

[56] References Cited

U.S. PATENT DOCUMENTS

| | | | |
|---|---|---|---|
| 4,098,956 | 7/1978 | Blickensderfer et al. | 428/469 |
| 4,146,309 | 3/1979 | Singh et al. | 428/696 |
| 4,157,417 | 6/1979 | Murphy | 428/461 |
| 4,158,718 | 6/1979 | Kehl et al. | 428/461 |
| 4,226,910 | 10/1980 | Dahlen et al. | 428/461 |
| 4,235,048 | 11/1980 | Gillery | 428/469 |
| 4,386,130 | 5/1983 | Hayashi et al. | 428/461 |
| 4,405,692 | 9/1983 | Yamagishi | 428/696 |
| 4,450,201 | 5/1984 | Brill et al. | 428/469 |
| 4,483,899 | 11/1984 | Kuwabara | 428/469 |

FOREIGN PATENT DOCUMENTS 0005343 6/1982 Japan ................................ 428/425.9

OTHER PUBLICATIONS

"Instrumental Methods of Chemical Analysis", G. W. Ewing, McGraw-Hill Book Co., p. 120.

Primary Examiner—George F. Lesmes
Assistant Examiner—William M. Atkinson
Attorney, Agent, or Firm—Sughrue, Mion, Zinn, Macpeak & Seas

[57] ABSTRACT

A selectively light transmission sheet composed of two selectively light transmitting structures, one comprising a single or separate two metal layers (A) and a single or separate two dielectric layers (B), another comprising an organic polymer layer (C) containing a near infrared ray absorbent.

11 Claims, No Drawings

SELECTIVE LIGHT TRANSMISSION SHEET

FIELD OF THE INVENTION

The present invention relates to a selective light transmission sheet which has a high per cent transmittance of visible rays and a high effect of controlling the incidence of solar energy.

BACKGROUND OF THE INVENTION

The sun's energy which strikes the surface of the earth is generally distributed in a wide spectral range from 350 nm to 2,100 nm and the maximum intensity of energy is found at 500 nm. When the sun's energy is divided into such spectral regions as the ultraviolet region of 449 nm or less, visible light region of 450 nm to 749 nm, and near infrared region of 750 nm to 2,100 nm, the intensity distribution of solar energy is as follows:

| | |
|---|---|
| Ultraviolet region (~449 nm): | 4.44% |
| Visible light region (450 nm~749 nm): | 46.3% |
| Near infrared region (750 nm~2,100 nm): | 49.22% |
| Total: | 100% |

According, in controlling the incidence of solar energy, the most effective result can be obtained by preventing the incidence of solar energy in both the visible light region and near infrared region. However, a shutout of the incidence of solar energy in the visible light region means the decrease of the intensity of light sensed by the human eye, making it dark as an inevitable consequence.

In case where a selective light transmission sheet of this invention is used on the window which forms an opening for a building, automobile, train, etc. to take in light, if the control of solar energy incidence is exercised to much as to lower the percent transmission of visible light of the window material, the proper function of a window becomes sacrificed and the house and car interiors suffer from optical hazards resulting from the remarkable loss of natural lighting visuality. Especially, the loss of visual transparency of the windshields is undesirable in view of the safety in the case of an automobile, train, and flying machine.

On the other hand, the rays in the near infrared region are not sensed by the human eye and it is accordingly possible to shut off by a maximum of about 50% of the incident solar energy while keeping the good optical environment when the per cent transmission of the rays of near infrared region is cut down effectively without controlling the per cent transmission of the visual light region.

DETAILED DESCRIPTION OF THE INVENTION

One of the objects of this invention is to provide a selective light transmission sheet which is made to have a high per cent transmission of visible light, a low per cent transmission of near infrared light, and a dazzling reflectance of visible light reduced to the lowest minimum, so that the incident solar energy may be controlled.

Another object of this invention is to provide structures which form a selective light transmission laminate having a simple makeup and well balanced optical properties including a low reflectance of visible light and a low ratio of the near infrared light transmittance vs. the visible light transmittance.

A further object of this invention is to provide an optically well balanced selective light transmission structure which is obtainable at a reasonable cost and has an outstanding durability.

Other objects and advantages of this invention will become apparent when the following detailed description is read.

The aforementioned objects of this invention can be accomplished by a selective light transmission sheet having a composite structure made up of
(i) the first selectively light transmitting structure comprising
  (a) a single layer or two separate layers of metal layer (A), 40 Å to 300 Å in thickness, selected from a group consisting of gold, silver, copper and their alloys, and
  (b) a single layer or two separate layers of dielectric layer (B), 30 Å to 1500 Å in thickness, and
(ii) the second selectively light transmitting structure comprising an organic polymer layer (C) which contains an absorbent of near infrared rays whose maximum absorption wavelength is in the range of 800 nm to 1,200 nm.

The metal which forms the metal layer (A) of this invention is selected from a group consisting of gold, silver, copper and their alloys made of any desired combination.

The metal layer (A) of this invention should desirably contain silver as its essential element and more particularly it should be a silver layer or silver alloy layer containing at least 30 wt % of silver. The silver layer or silver alloy layer of this type is desirable in view of the object of this invention since it is in the form of a very thin film and optically has a high transmittance over the whole region of visible light wavelength and also possesses a basic nature to well reflect the light of wavelength longer than that of visible light. The metal layer (A) of silver alloy comprising silver and gold and/or copper is especially desirable from the view point of durability. It is advisable to use less than 20% copper and/or less than 50% gold.

The thickness of the metal layer (A) should usually be 500 Å or less and it is advisable to make it 160 Å thick or less in order to obtain a metal layer having higher transmittance of visible light. Also the metal layer should be made to have the thickness of the minimum limit of 40 Å or more to let it keep the stable film form. Furthermore, it is preferable to form a precoat layer so that the metal layer will be more stable. As the precoat layer, a metal layer formed of such metal as titanium, zirconium, silicon and nickel, to a thickness of 5 Å to 50 Å, and a metal oxide layer formed of such metal oxide as titanium oxide, zirconium oxide, silicon oxide, bismuth oxide, aluminum oxide, and zinc oxide, to a thickness of 10 Å to 100 Å may be mentioned. The precoat layer functions as a nucleation layer during the formation of a metal layer and works as a protective layer after the formation of the metal layer.

It is useful to establish a postcoat layer upon the metal layer to improve its durability. As the postcoat layer, any of the abovementioned precoat layers may be selected for such use.

As the materials of the dielectric layer (B) of this invention, inorganic or organic dielectric substance having a refractive index of 1.35 to 2.5 may be mentioned. As the inorganic dielectric substances, there are such metal oxides as titanium oxide, zirconium oxide, silicon oxide, indium oxide, tin oxide, aluminum oxide and cerium oxide, and such metal compounds as magnesium fluoride, and zinc sulfide. As the organic dielectric substances, such transparent organic polymers as acrylic resin, acrylate resin, styrene resin, urethane resin, epoxy resin, polyester resin, polyvinyl resin, phenoxy resin, nylon resin, melamine resin and fluorine-contained resin may be mentioned as typical ones.

The dielectric layer is usually made to a thickness ranging from 30 Å to 1,500 Å; however, a coating having a refractive index of 1.5 or more and a comparatively small thickness of 30 Å to 700 Å, for instance, is satisfactory enough for use as an antireflection coating of the metal layer and in case where it is used as a dielectric coating for multiinterference filter, it must be made to have a comparatively large thickness such as 300 Å to 1,500 Å.

The organic polymer layer (C) of this invention is formed of an organic polymer made to contain a near infrared ray absorbent.

The quantity of a near infrared ray absorbent to be contained in the organic polymer layer makes an important determinant of the near infrared ray transmission factor of a light transmission sheet. Though the optimum concentration of a near infrared ray absorbent varies depending upon the compounds because the molar absorption coefficient of a near infrared ray absorbent is distributed in the range of 6,000 to 30,000, the absorbent must necessarily be contained in such a way as to make the organic polymer layer have a transmission factor of 30% or less at the maximum absorption wavelength and a transmission factor of 50% or more at the maximum transmission wavelength in the visible light region from the viewpoint of optical properties required of the organic polymer layer.

In some cases, the near infrared ray absorbent becomes partly inactivated under the influence of its host organic polymer itself, aftertreatment conditions (including heat treatment, etc.), and other additives (including a stabilizer, ultraviolet ray absorbent, etc.) contained in the host organic polymer.

Taking consideration of this fact, it is advisable to control the concentration of a near infrared ray absorbent within the range of $1.0 \times 10^{-10}$ to $9.0 \times 10^{-4}$ mol/cm$^2$, preferably within the range of $1.0 \times 10^{-9}$ to $9.0 \times 10^{-5}$ mol/cm$^2$ in general. In the case of [bis(1-methyl-3,4-dithiophenolate) nickel]tetra-n-butyl ammonium, it is used at a concentration of $1.0 \times 10^{-8}$ to $5 \times 10^{-5}$ mol/cm$^2$. Here, the unit (mol/cm$^2$) expresses the number of mols of a near infrared ray absorbent existing in the unit area of the organic polymer layer (C) and indicates the total number of mols upon which the incident light ray falls per square centimeter of the organic polymer layer (C).

No limit may necessarily be placed upon the thickness of an organic polymer layer (C) provided that the presence of a near infrared ray absorbent satisfies the abovementioned conditions and the light attains to a desired attenuation factor in its optical path while passing through the organic polymer layer (C). Selection of its thickness depends on the type, size, material, etc. of the window to which it is to be applied.

No special limit may be set on the organic polymers, so far as they are transparent and allow a near infrared ray absorbent to be dissolved or dispersed in them. As examples of such organic polymers, acrylic resin, acrylate resin, styrene resin, urethane resin, epoxy resin, polyester resin, polyvinyl resin, phenoxy resin, nylon resin, melamine resin, fluorine-contained resin, and polyvinyl formal resin may be mentioned. The organic polymer layer (C) can also function as a base film of the optical laminate in the present invention and such polymers as polyethylene terephthalate, polycarbonate, polypropylene, polyethylene, polyethylene naphthalate, polyethersulfone and polysulfone may be used as desirable polymers in this case. As the near infrared ray absorbent to be contained in the organic polymer layer, those absorbents having their maximum absorption wavelengths in the range of 800 nm to 1,200 nm and also a good compatibility with an organic polymer are desirable. Such near infrared ray absorbents, those metal complex compounds expressed by the following formula (I) are usually mentioned

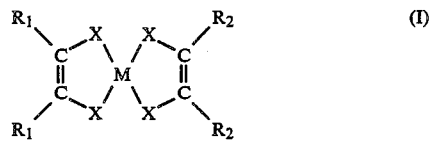

(wherein M indicates a nickel (Ni) atom or platinum (Pt) atom; X indicates an oxygen (O) atom or sulfur (S) atom; $R_1$ and $R_2$ respectively represent a hydrocarbon group which may be substituted by a halogen atom and a pair of $R_1$s may combine with each other and another pair of $R_2$s may likewise combine with each other to separately form, with the linked two carbon atoms, aromatic hydrocarbon groups which may be substituted by a halogen atom respectively).

Referring to the aforementioned formula (I), those compounds wherein X is a sulfur (S) atom and a pair of $R_1$s and another pair of $R_2$s are respectively combined with each other to separately form, with the linked two carbon atoms, aromatic hydrocarbons which may be substituted by a halogen atom respectively are desirable, especially when

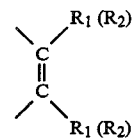

is an o-phenylene group having a halogen atom and/or a low alkyl group as a substituent group, from the viewpoint of absorptivity and weatherability.

As the especially desirable near infrared ray absorbents, [bis-(1-methyl-3,4-dithiophenolate) nickel]tetrabutylammonium, [bis(1-methyl-3,4-dithiophenolate)-platinum]tetrabutylammonium, [bis (1,2-dichloro-4,5-dithiophenolate)nickel]tetrabutylammonium, [bis(1,2,3,4-tetrachloro-5,6-dithiophenolate) nickel]tetrabutylammonium, etc. may be exemplified and, to give a concrete example, IR ABSORBER PA-1001, -1006, manufactured by Mitsui Toatsu Chemicals, Inc., may be used. The use of these recommendable near infrared ray absorbent in the aforementioned quantity can bring the near infrared ray transmission factor to 40% to 70%, desirably to 50% to 65%, when normalized with the solar energy intensity distribution, and also can keep down the absorption factor of visible light low.

As the composite structure of selective light transmission laminate of the present invention formed of the respective layers described above, there are (i) a combination of the first selectively light transmitting structure, which comprises a single layer of metal layer (A) and a single layer or two separate layers of dielectric layer (B), and the second selectively light transmitting structure comprising an organic polymer layer (C), and (ii) a combination of the first selectively light transmitting structure, which comprises two separate layers of metal layer (A) and a single layer or two separate layers of dielectric layer (B), and the second selectively light transmitting structure comprising an organic polymer layer (C);

however, the combination (i) has a greater combination effect. As the laminated structures based on the above mentioned combinations, (a) base film/1st selectively light transmitting structure/2nd selectively light transmitting structure, (b) 2nd selectively light transmitting structure/base film/1st selectively light transmitting structure, (c) 2nd selectively light transmitting structure (also functioning as base film)/1st selectively light transmitting structure, and (d) base film/2nd selectively light transmitting structure/1st selectively light transmitting structure may be mentioned and, of them all, (b) and (d) are desirable from the viewpoint of selective light transmittancy and durability.

By the application of the aforementioned combination structure (i), an optical laminate, which has a visible light transmission factor (Tvis) of 50% to 80% visible light reflection factor of 25% or less, near infrared ray transmission factor (Tni) of 10% to 50%, and infrared ray reflection factor (Ri) of 40% to 90%, can be obtained.

Furthermore, when the metal layer (A) is made to have a small thickness of, for instance, 160 Å or less, an excellent selective optical laminate having Tvis of 65% to 80%, Rvis of 15% or less, Tni of 20% to 50%, and Ri of 40% to 70% can be obtained.

While the application of the aforementioned combination structure (ii) gives an optical laminate having Tvis of 60% to 75%, Tni of 10% to 40%, and Ri of 40% to 80%.

The increase of a near infrared ray absorbent, for instant, to $5 \times 10^{-8}$ mol/cm$^2$ or more, contributes to the formation of an optical laminate with Tvis ranging from 70% to 75%, Tni from 20% to 35%, and Ri from 40% to 70%. This practice is especially desirable since the visible light reflection factor (Rvis) can be suppressed to 12% or less.

Also, the ratio (Tni/Tvis) can be used as a useful parameter in expressing the selective light transmittancy of a light transmission sheet of this invention. In the case of both the aforementioned combination structures (i) and (ii), a combination structure with Tni/Tvis<0.5 may be said to be especially desirable in the present invention.

The formation of the metal layer (A) of this invention can be carried out according to any of hitherto known methods of forming a thin metal layer such as vacuum deposition, cathode sputtering, and ion plating, of which the cathode sputtering method is desirable in view of the uniformity of structure and thickness of a metal layer when it is made of a metal alloy.

The formation of a precoat layer of metal or metal oxide can be achieved according to the methods mentioned above; however, in case where a precoat layer of metal oxide is desired, a desired precoat layer of silicon oxide, titanium oxide, or zirconium oxide can be obtained by first forming a coating of corresponding organic metal compound such as organic silicate, organic titanate, or organic zirconate, then followed by the hydrolysis.

A postcoat layer which is established mainly for improving the durability can also be formed according to the same procedure taken for the formation of a precoat layer.

The dielectric layer (B) should desirably be formed according to the following method. In case where a metal oxide is used as a dielectric substance, the dielectric layer can be formed by means of physical vapor deposition such as sputtering and vacuum deposition and also by coating and hydrolysis of an organic metal compound. In another case where an organic polymer is used as a dielectric substance, the dielectric layer can be formed by dissolving an organic polymer in a suitable solvent, diluting it to a proper concentration, coating it by means of spin-coating, bar-coating, reverse roll coating, or gravure roll coating, and drying.

The organic polymer layer (C) which contains a near infrared ray absorbent can be formed by coating a solution containing an organic polymer and a near infrared ray absorbent at a prescribed ratio, followed by the removal of the solvent by evaporation. In case where the organic polymer layer (C) is also to function as a base film, a near infrared ray absorbent may be mixed with the polymer before the formation of the base film.

The selective light transmission sheet of the present invention can furthermore have a protective layer formed on its outermost layer. The protective layer can be formed from any of generally known various inorganic or organic materials such as those described in U.S. Pat. No. 4,320,169 to a thickness of 0.1 μm to 50 μm. The method of forming a protective layer may be selected from among the physican vapor deposition methods, chemical coating methods and methods of laminating organic polymer film.

Thus prepared selective light transmission sheet of this invention can be used by applying it directly to the surface of a window or windshield of the building and car and also for making laminated glass having one or more than one selective light transmission sheet sandwiched in between a plurality of plate glasses.

The present invention has accordingly made it possible to provide a selective light transmission sheet, which is simple in structure, economizes in cost, and is suited to industrial large-scale production, having an outstanding optical properties, which has never been though of, by balancing hitherto conflicting arguments of a high degree of visible light transmission and a high degree of solar energy interruption.

In the present invention, optical properties (transmission factor, reflection factor) were determined with the self-recording spectrophotometer model 330 made by Hitachi Ltd. according to "On a method of calculating the load on the window glass in room cooling" (Asahi Glass Research Report, vol. 21, 1971) under the following.

The integral visible ray transmission factor (450 nm∼749 nm) and integral near infrared ray transmission factor (750 nm∼2,100 nm) were determined according to the following method in all Examples.

| "Solar energy intensity factor distribution" | | |
|---|---|---|
| Region | Wavelength nm (λi) | Distribution (Gλi) |
| Near ultraviolet ray | 350 | 1.27 |
| | 400 | 3.17 |
| Visible ray | 450 | 6.79 |
| | 500 | 8.2 |
| | 550 | 8.03 |
| | 600 | 7.88 |
| | 650 | 7.92 |
| | 700 | 7.48 |
| Near infrared ray | 750 | 5.85 |
| | 800 | 5.78 |
| | 850 | 5.66 |
| | 900 | 3.24 |
| | 950 | 3.29 |
| | 1000 | 4.25 |
| | 1050 | 3.72 |
| | 1100 | 1.70 |
| | 1150 | 1.46 |
| | 1200 | 2.51 |
| | 1250 | 2.21 |
| | 1300 | 1.78 |
| | 1350 | 0.12 |
| | 1400 | |
| | 1450 | 0.16 |
| | 1500 | 1.06 |
| | 1550 | 1.49 |
| | 1600 | 1.36 |
| | 1650 | 1.17 |
| | 1700 | 0.89 |
| | 1750 | 0.54 |
| | 1800 | |
| | 1850 | |
| | 1900 | |
| | 1950 | 0.12 |
| | 2000 | 0.02 |
| | 2050 | 0.26 |
| | 2100 | 0.58 |

$$\text{Integral visible ray transmission factor} = \frac{\sum_{i=450}^{749} G\lambda i \times Ti}{\sum_{i=450}^{749} G\lambda i}$$

$$\text{Integral near infrared ray transmission factor} = \frac{\sum_{i=750}^{2100} G\lambda i \times Ti}{\sum_{i=750}^{2100} G\lambda i}$$

wherein Ti indicates a transmission factor of the test sample at wavelength λi.

With regard to the integrated visible light transmission factor was also determined (at 400~760 nm) according to the method of JIS-R-3212 and the larger of the obtained values was placed on record.

EXAMPLE 1

A selective light transmission laminate structure was prepared by forming a silver/copper alloy layer (containing 10 wt % copper) to a thickness of 80 Å as the first layer on a substrate of biaxially oriented polyethylene terephthalate film having a thickness of 50 μm, then by forming a transparent dielectric layer of zirconium oxide to a thickness of 200 Å as the second layer, and further by forming a thin layer of polymethacrylonitrile containing a near infrared ray absorbent (containing 10 phr of near infrared ray absorbent) to a thickness of 2 μm as the third layer "phr" means "per hundred of resin".

The thin silver/copper alloy layer containing 10 wt % copper was formed by DC magnetron sputtering with the use of a silver/copper alloy containing 10 wt % copper as a target in argon gas under pressure of $5 \times 10^{-3}$ Torr. The making power was 2 W/cm² per unit area of the target.

The transparent dielectric layer was formed as follows. 7 wt % tetrabutylzirconate monomer was dissolved in a mixed solvent consisting of 3 parts of butanol and 2 parts of normal hexane, to which acetylacetone equimolar with said tetrabutylzirconate in amounts was added to prepare a coating solution of tetrabutylzirconate. The solution was coated with a bar-coater and the coating was dried at 120° C. for 3 min. to form a zirconium oxide layer.

The thin layer of polymethacrylonitrile containing a near infrared ray absorbent was prepared in the following way. Firstly, 10 parts of polymethacrylonitrile and 10 phr of [bis(1-methyl-3,4-dithiophenolate)nickel]tetra-n-butylammonium were dissolved in a mixed solvent consisting of cyclohexanone and methyl ethyl ketone at the weight ratio of 1:1 to give a 10 wt % polymethacrylonitrile solution. Then the solution was coated with a bar-coater and the coating was dried at 130° C. for 2 min. to form a thin layer having a thickness of 2 μm.

Thus obtained optical laminate structure had an integrated visible light transmission factor of 82% (according to JIS-R-3212), integrated visible light reflection factor of 11%, and integrated near infrared ray transmission factor of 37%.

EXAMPLE 2

A thin layer of silver having a thickness of 160 Å as the first layer and a transparent dielectric layer of zirconium oxide having a thickness of 200 Å as the second layer were respectively formed on one side of a substrate of biaxially stretched polyethylene terephthalate film having a thickness of 50 μm. Thereafter, a thin layer of polymethacrylonitrile containing a near infrared absorbent (containing 15 phr of near infrared absorbent) was formed to a thickness of 5 μm on the other side of the substrate to obtain a selective light transmission sheet.

Said thin layer of silver was formed by DC magnetron sputtering with the use of a silver plate as a target in argon gas under pressure of $5 \times 10^{-3}$ Torr. The making power was 2 W/cm² per unit area of the target.

The transparent dielectric layer was formed by coating a solution, which was prepared by dissolving 7 wt % tetrabutylzirconate monomer in a mixed solvent consisting of 3 parts of butanol and 2 parts of normal hexane followed by further addition thereto at the ratio of 0.5 mole of acetylacetone to 1 mole of said tetrabutylzirconate, with a bar-coater and by drying the coating at 120° C. for 3 min.

The thin layer of polymethacrylonitrile containing a near infrared ray absorbent was formed to a thickness of 5 μm by first preparing a solution of 10 wt % polymethaacrylonitrile by dissolving 10 parts of polymethacrylonitrile and 15 phr of [bis(1,2,3,4-tetrachloro-5,6-dithiophenolate)nickel]tetra-n-butylammonium in a mixed solvent consisting of cyclohexanone and methyl ethyl ketone at the weight ratio of 1:1, by coating the solution with a bar-coater, and by drying the coating at 130° C. for 2 min.

The obtained optical laminate structure had an integrated visible light transmission factor (JIS-R-3212) of 65%, integrated visible light reflection factor (JIS-R-

3212) of 17%, and integrated near infrared ray transmission factor of 14%. Also the infrared ray reflection factor at 10 μm was about 90%.

EXAMPLE 3

A selective light transmission sheet having the undermentioned (C)/substrate/(A)/(B)/(A) laminate structure was prepared by composing the first selectively light transmitting structure comprising two thin layers of silver/copper alloy (A) (containing 10 wt % copper) each having a thickness of 60 Å, which formed as the first layer and the third layer, and one transparent dielectric layer (B) formed of polystyrene to a thickness of 700 Å as the second layer sandwiched in between said two thin layers of silver/copper alloy (A), on one side of a substrate biaxially oriented polyethylene terephthalate film having a thickness of 50 μm, and also by composing the second selectively light transmitting structure comprising a thin layer of polystyrene (C), 2 μm thick, containing a near infrared ray absorbent (containing 10 phr of near infrared ray absorbent) on the other side of the substrate.

The thin layers of silver/copper alloy (A) (containing 10 wt % copper) were formed by DC magnetron sputtering with the use of a silver/copper alloy containing 10 wt % copper as a target in argon gas under pressure of $5 \times 10^{-3}$ Torr. The making power was 2 W/cm$^2$ per unit area of the target.

The transparent dielectric layer (B) formed of polystyrene to a thickness of 700 Å was obtained by coating a solution, which was prepared by dissolving 2 wt % polystyrene in a mixed solvent consisting of 5 parts of toluene, 1 part of methyl ethyl ketone, and 1 part of ethyl acetate, with a bar-coater, followed by drying.

The thin layer of polystyrene (C) containing a near infrared absorbent was obtained as follows. A solution containing 10 wt % polystyrene was prepared by dissolving 10 parts of polystyrene and 10 phr of [bis(1-methyl-3,4-dithiophenolate) nickel]tetra-n-butylammonium in a mixed solvent consisting of 7 parts of toluene and 3 parts of ethyl acetate and coated with a bar-coater. The coating was then dried at 130° C. for 2 min. to form the desired 2 μm thick thin layer (C) containing a near infrared ray absorbent.

The obtained optical laminate structure had an integrated visible light transmission factor (JIS-R-3212) of 75% and integrated near infrared ray transmission factor of 34%. The infrared ray reflection factor at 10 μm was about 80%.

EXAMPLE 4

A selective light transmission sheet was prepared by composing the first selectively light transmitting structure comprising two thin layers (A) of silver/copper alloy containing 5 wt % copper formed to a thickness of 80 Å, having a 10 Å thick precoat layer of metallic titanium and a 20 Å thick postcoat layer of metallic titanium, as the first and third layers, one transparent dielectric layer (B) formed of polymethacrylonitrile to a thickness of 800 Å as the second layer sandwiched between said first and third layers, and then by composing the second selectively light transmitting structure comprising an organic polymer layer (C) formed of polymethacrylonitrile to a thickness of 5 μm, containing 10 phr of near infrared ray absorbent, thereon as the fourth layer, all these four layers being formed one upon another on a substrate of biaxially oriented polyethylene terephthalate film having a thickness of 75 μm.

The thin layers (A) of silver/copper alloy containing 5 wt % copper were formed by DC magnetron sputtering with the use of a silver/copper alloy target containing 5 wt % copper according to the same method as Example 1. Both the precoat layer and postcoat layer of metallic titanium were formed by RF magnetron sputtering with the use of metallic titanium as a target as thin layers metallic titanium.

The transparent dielectric layer (B) formed of polymethacrylonitrile to a thickness of 800 Å was obtained by coating a solution, which was prepared by dissolving 2 wt % polymethacrylonitrile in a mixed solvent consisting of 5 parts of cyclohexanone and 2 parts of methyl ethyl ketone, with a bar-coater.

The organic polymer layer (C) formed of polymethacrylonitrile to a thickness of 5 μm containing 10 phr of near infrared ray absorbent was obtained by coating a solution, which was prepared by dissolving polymethacrylonitrile containing 10 phr of [bis(1-chloro-3,4-dithiophenolate)nickel]tetrabutylammonium as a near infrared ray absorbent in a mixed solvent consisting of 5 parts of cyclohexanone, 4 parts of methyl ethyl ketone, and 1 part of acetone in such a way as to contain 10 wt % polymethacrylonitrile, with a bar-coater, followed by drying.

The obtained optical laminate structure had an integrated visible light transmission factor of 63%, integrated visible light reflection factor of 12%, and integrated near infrared ray transmission factor of 15%.

EXAMPLE 5

A laminate structure was obtained by laminating the following layers one upon another on a substrate of biaxially oriented polyethylene terephthalate film haviug a thickness of 75 μm: a precoat layer formed of metallic titanium to a thickness of 10 Å, thin layer (A) of silver/gold alloy containing 20 wt % gold having a thickness of 120 Å, postcoat layer formed of metallic titanium to a thickness of 20 Å, and transparent dielectric layer (B) of titanium oxide formed from tetrabutyltitanate to a thickness of 150 Å.

The thin layer (A) of silver/gold alloy containing 20 wt % gold was formed by DC magnetron sputtering with the use of silver/gold alloy containing 20 wt % gold as a target according to the same method as Example 1. The precoat layer and postcoat layer formed of metallic titanium were prepared by RF magnetron sputtering with the use of metallic titanium as a target as thin layers of metallic titanium. The transparent dielectric layer (B) formed from tetrabutyltitanate was obtained by first dissolving 5 wt % tetrabutyltitanate in a mixed solvent consisting of 3 parts of butanol and 1 part of toluene, coating the solution with a bar-coater, and drying the coating at 130° C. for 3 min.

On the other side of thus processed laminate structure (the reverse surface of the substrate of polyethylene terephthalate film), a thin layer formed of polystyrene containing [bis(1-methyl-3,4-dithiophenolate)nickel]tetrabutylammonium as a near infrared ray absorbent to a thickness of 4 μm.

This thin layer containing a near infrared absorbent was formed by coating a solution, which was prepared by dissolving 5 phr of [bis(1-methyl-3,4-dithiophenolate)nickel]tetrabutylammonium and 20 parts of polystyrene in a mixed solvent consisting of 60 parts of methyl ethyl ketone and 20 parts of toluene, with a bar-coater, followed by drying the coating at 120° C. for 1 min.

Thus obtained selective light transmission sheet had an integrated visible light transmission factor of 82% and near infrared ray transmission factor of 35%.

EXAMPLE 6

A selective light transmission sheet was prepared according to Example 3, except that the second layer of transparent dielectric layer (B) in Example 3 was formed from a copolymer of methacrylonitrile.2-hydroxyethylmethacrylate in the place of polystyrene.

The transparent dielectric layer (B) formed from a copolymer of methacrylonitrile.2-hydroxyethylmethacrylate was obtained as follows: 1 part of a copolymer (90 parts of methacrylonitrile and 10 parts of 2-hydroxyethylmethacrylate) and 0.4 part of isocyanate compound (an adduct formed by treating trimethylolpropane with xylylenediisocyanate:tradename Takenate A-10, by Takeda Chemical Ind., Ltd.) were dissolved in a mixed solvent of cyclohexanone/acetone/methyl ethyl ketone (5:2:1) to make a solution containing 2 wt % said copolymer. The solution was coated with a bar-coater and then the coating was dried at 120° C. for 2 min. to give a thin layer of said copolymer crosslinked with the aforementioned isocyanate compound.

The obtained laminate had an integrated visible light transmission factor of 74% and integrated near infrared ray transmission factor of 35%.

EXAMPLE 7

A selective light transmission laminate structure was prepared by forming a silver/gold alloy layer (containing 15 wt % gold) having a thickness of 100 Å as the first layer on a substrate of biaxially oriented polyethylene telephthalate film of a 75 μm thick, then a transparent dielectric layer of tetrabutyltitanate having a thickness of 150 Å as the second layer, and further a thin layer of polystylene containing a near infrared ray absorbent (containing 15 phr of near infrared ray absorbent) having a thickness of 20 μm as the third layer.

The thin silver/gold alloy layer containing 15 wt % gold was formed by DC magnetron sputtering with the use of a silver/gold alloy containing 15 wt % gold as a target in argon gas under pressure of $5 \times 10^{-3}$ Torr. The making power was 2 W/cm² The making power was 2 W/cm² per unit area of the target.

The transparent dielectric layer was formed as follows. 3 wt % tetrabutyltitanate was dissolved in a mixed solvent consisting of 5 parts of butanol and 2 parts of normal hexane.

The solution was coated with a bar coater and the coating was dried at 130° C. for 3 min. to form a titanium oxide layer. The thin layer of polystylene containing a near infrared ray absorbent was prepared in the following way. Firstly, 20 parts of polystylene and 15 phr of [bis(1-methyl-3,4-dithiophenolate) platinum]tetra.n-butylammonium were dissolved in a mixed solvent consisting of toluene and methyl ethyl ketone at the weight ratio of 1:1 to give a 20 wt % polystylene solution. Then the solution was coated with a bar-coater and the coating was dried at 120° C. for 2 min. to form a thin layer having a thickness of 20 μm.

Thus obtained optical laminate structure had an integrated visible light transmission factor of 61% (according to JIS-R-3212), integrated visible light reflection factor of 11%, and integrated near infrared ray transmission factor of 22%.

We claim:

1. A selective light transmission sheet having a selective light transmission laminate structure whose laminate structure comprises:
a first selectively light transmitting structure comprising:
  (a) at least one metal layer formed of a metal selected from the group consisting of gold, silver, copper and their alloys, having a thickness ranging from 40 Å to 300 Å, and
  (b) at least one dielectric layer having a refractive index of 1.35 to 2.5 and having a thickness ranging from 30 Å to 1,500 Å, and
a second selectively light transmitting structure comprising an organic polymer layer which contains a near infrared ray absorbent whose maximum absorption wave length is in the range of 800 nm to 1,200 nm, wherein said second selectively light transmitting structure has a transmission factor of 30% or less at the maximum absorption wavelength and, a visible light transmission factor of 50% or more, wherein said selective light transmission sheet has a visible light transmission factor of 50 to 80%.

2. A selective light transmission sheet according to claim 1, wherein said metal layer contains at least 30 wt % silver.

3. A selective light transmission sheet according to claim 1, wherein said organic polymer layer contains a near infrared ray absorbent in amounts of $1.0 \times 10^{-10}$ mol/cm² to $9.0 \times 10^{-4}$ mol/cm².

4. A selective light transmission sheet according to claim 1, wherein said first selectively light transmitting structure, comprises one metal layer and one dielectric layer formed thereon.

5. A selective light transmission sheet according to claim 1, wherein said first selectively light transmitting structure, comprises two separate metal layers and one dielectric layer which is sandwiched between said two metal layers 6. A selective light transmission sheet according to claim 1, wherein said metal layer has a metal or metal oxide precoat layer having a thickness of 5 to 100 Å.

7. A selective light transmission sheet according to claim 1, wherein said metal layer has a metal or metal oxide postcoat layer having a thickness of 5 to 100 Å.

8. A selective light transmission sheet according to claim 1, wherein said metal layer has both a metal or metal oxide precoat layer having a thickness of 5 to 100 Å and a metal or metal oxide postcoat layer having a thickness of 5 to 100 Å.

9. The selective light transmission sheet according to claim 1, wherein said first selectively light transmitting structure comprises two separate metal layers and two separate dielectric layers.

10. A selective light transmission sheet according to claim 1, wherein said near infrared ray absorbent is a compound expressed by formula (I):

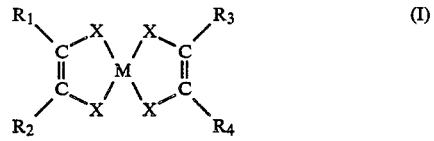

wherein M indicates a nickel (Ni) atom or a platinum (Pt) atom; X indicates an oxygen (O) atom or a sulfur (S) atom; $R_1$, $R_2$, $R_3$, and $R_4$ each represent an unsubstituted hydrocarbon group or a hydrocarbon group substituted by a halogen atom.

11. The selective light transmission sheet according to claim 10, wherein $R_1$ and $R_2$ combine with each other and $R_3$ and $R_4$ combine with each other to form unsubstituted aromatic hydrocarbon groups or substituted aromatic hydrocarbon groups substituted by a halogen atom.

* * * * *